United States Patent [19]

Remillard

[11] Patent Number: 5,504,519
[45] Date of Patent: Apr. 2, 1996

[54] METHOD AND APPARATUS FOR PRINTING COUPONS AND THE LIKE

[75] Inventor: Roger Remillard, Skokie, Ill.

[73] Assignee: Viscorp, Chicago, Ill.

[21] Appl. No.: 87,370

[22] Filed: Jul. 2, 1993

Related U.S. Application Data

[63] Continuation-in-part of Ser. No. 770,520, Oct. 3, 1991, and a continuation-in-part of Ser. No. 952,434, Sep. 28, 1992, and a continuation-in-part of Ser. No. 952,435, Sep. 28, 1992.

[51] Int. Cl.⁶ ............................ H04N 7/00; H04N 7/12
[52] U.S. Cl. ........................ 348/7; 348/9; 348/10; 348/13
[58] Field of Search ..................... 348/1, 2, 6, 7, 348/8, 9–13, 61, 473, 42, 465, 586; 364/401, 405

[56] References Cited

U.S. PATENT DOCUMENTS

| | | |
|---|---|---|
| 4,745,468 | 5/1988 | Von Kohorn . |
| 4,876,592 | 10/1989 | Von Kohorn . |
| 4,905,094 | 2/1990 | Pocock et al. ............................ 348/7 |
| 4,926,255 | 5/1990 | Von Kohorn . |
| 4,987,486 | 1/1991 | Johnson et al. ......................... 348/10 |
| 5,034,807 | 7/1991 | Von Kohorn . |
| 5,057,915 | 10/1991 | Von Kohorn . |
| 5,077,607 | 12/1991 | Johnson et al. ......................... 348/13 |
| 5,128,752 | 7/1992 | Von Kohorn . |
| 5,173,851 | 12/1992 | Off et al. ................................ 364/401 |
| 5,227,874 | 7/1993 | Von Kohorn . |
| 5,249,044 | 9/1993 | Von Kohorn ........................... 364/401 |
| 5,285,278 | 2/1994 | Holman ..................................... 348/9 |
| 5,287,181 | 2/1994 | Holman ..................................... 348/1 |

*Primary Examiner*—Wing F. Chan
*Attorney, Agent, or Firm*—Townsend and Townsend and Crew

[57] ABSTRACT

An electronic device and method for accessing remote electronic facilities and displaying associated information on a conventional television set. The electronic device self-configures itself upon power-up or reset by initiating a data call to a configuring facility. Information related to available facilities and programming, autonomous mail checking is downloaded to the electronic device. The electronic device displays a menu including several user selectable facilities on the display for a user. The user chooses one of the options from the menu by use of a remote keypad control, similar to a conventional television remote control. The options available include printing, electronic mail and other news and information services. Interfacing the electronic device with a stylus-type pointing device permits sketching and drawing on the television, including superposition of images on captured television images. Captured images of graphics or text are optionally stored or forwarded to a user through a mail facility accessed through operation of the system.

19 Claims, 5 Drawing Sheets

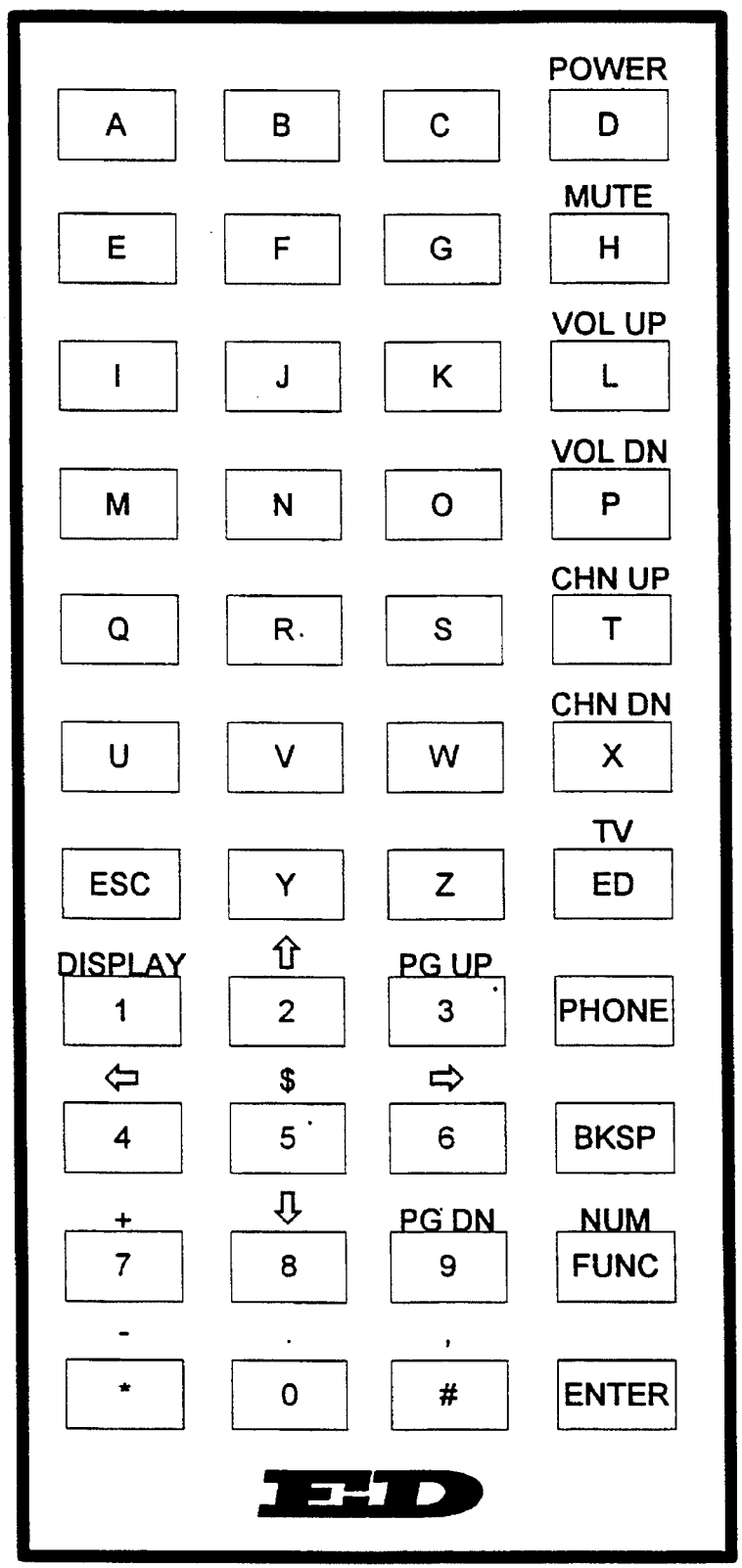
FIG_5

METHOD AND APPARATUS FOR PRINTING COUPONS AND THE LIKE

CROSS-REFERENCE TO RELATED APPLICATIONS

This application is a continuation-in-part of U.S. patent application Ser. No. 07/770,520, filed 3 Oct. 1991, titled APPARATUS AND METHOD FOR ELECTRONIC DEVICE FOR VIDEOTEXT NETWORK, and a continuation-in-part of U.S. patent application Ser. No. 07/952,434 filed on 28 Sep. 1992, titled METHOD AND APPARATUS FOR INTERACTIVE TELEVISION THROUGH USE OF INTERACTIVE TELEVISION and a continuation-in-part of U.S. patent application Ser. No. 07/952,435 filed on 28 Sep. 1992, titled METHOD AND APPARATUS FOR TELEVISION-TO-TELEVISION COMMUNICATION, all hereby expressly incorporated by reference for all purposes.

BACKGROUND OF THE INVENTION

The present invention relates generally to interactive television. More specifically, the present invention relates to an electronic device for monitoring specific television activity (e.g. program or commercial viewing) and communicating monitored activity to a facility and initiating appropriate actions dependent upon the specific television activity detected. Television activities also include advertisements, presentations, contribution solicitations, and home purchasing shows, for example.

It is known in the art to survey television program viewing habits of television audiences. These surveys are especially important for commercial television broadcasting because advertising and programming decisions are based on television show popularity. Many different types of surveys are available, but one of the most accurate types is in-home monitoring. An in-home monitoring survey relates to those surveys taken when a rating company provides a household with special hardware equipment that automatically records and logs television activity. This surveying method has a number of problems. One problem relates to an expense associated with the specialized hardware along with its attendant consequence that the hardware cost limits a size of the survey sample. Another problem is that there is an error introduced into the surveying method due to the household's awareness of the survey, reflected by the presence of the special hardware. It would be desirable to have a cost effective system able to monitor accurately and cost-efficiently the viewing habits of a wide range of households.

In television broadcasting, it is also desirable to interact with the viewer. There are many commercials and programs which request viewer action such as purchasing an advertised product, making a monetary contribution, responding to a survey, answering a question, or participating in contests with other viewers, for example. Also, companies sponsoring these commercials or programs would sometimes like to provide their viewers with further information, if the viewers could be identified or if the viewer requests the information. It is difficult to separate the actual viewers from the entire television viewing audience. Identification permits the producer of the show to use cost-effective, targeted advertising, rather than other options, such as the more expensive general mailings. An additional problem is that it is difficult to motivate a viewer to request information, to send in a contribution, or to specifically respond as desired. It is desirable to provide a ready and efficient method and apparatus to facilitate an exchange of information between television viewers and producers, promoters and advertisers associated with television programming.

Merchandisers have developed the idea of money-off coupons for promoting their products. As shopping moves into the home, a method of gaining access to the home purchasers to affect their purchasing decisions is needed. Supermarkets now include coupon printers for printing coupons at the time of checkout. These coupons correspond to or complement one or more of the products actually purchased. In some cases, the printed coupons are for directly competing goods.

SUMMARY OF THE INVENTION

The present invention provides apparatus and method for simply, efficiently and economically providing facility access to any user, providing any user with an ability to interact with television or cable programming, and providing automatic monitoring of each user's viewing habits allowing construction of a viewing profile. The invention permits access and use of the tremendous information and services available in electronic form without knowledge of computer components or configuration requirements, interactive use of the television programming, and cost-effective programming monitoring. Access to information and use of the various electronic services, as well as the television interaction activities, is possible by use of a conventional numeric remote keypad for selecting particular menu items from menus displayed on conventional television sets.

According to one aspect of the present invention, it includes a television set, a communications device connected to a communications network, such as a telephone system, a remote keypad and a controller. The controller displays menu items on a portion of a screen of the television and controls operation of the communications device. The menu items correspond to various services provided to a user. Numbers, 0–9, identify the individual menu items that are selectable from the remote keypad. Some services are better implemented with alphabetical characters. In those instances, the remote keypad is provided with alpha-numeric characters. The controller includes a tuner coupled to the television and to an LED readout identifying a selected channel viewed by the user, and a "genlock" apparatus. The preferred embodiment employs the well-known genlock principle in a novel way to facilitate interactiveness with television programming as well as to provide economic telestration capabilities to the home user.

In operation, the controller initiates an automated configuration mode upon initial power-up. The automated configuration includes initiation of a data call to a predetermined independent computer system to acquire configuration information and operating instructions. The configuration information includes data identifying particular services desired by the particular user. The configuration information controls which menu choices the user may select. Through use of the remote keypad, the user is able to tune the television to a desired broadcast or cable station because of the built-in tuner. The controller monitors television channel selection information and time/date stamps the station selection information, and thereby indirectly, all programs the user watches. The controller assembles all the monitored television information into a user profile. Periodically, the controller uploads the user profile information to an appropriate facility through by use of the telecommunications medium.

Further, the genlock mechanism permits the controller to overlay a control menu or an interaction menu over all or a portion of a television screen, as desired. The preferred embodiment adds the interaction menu to a bottom portion of the screen and preempts or overlays the incoming programming in that portion of the screen displaying the interaction menu. Selecting various interaction options from the interaction menu with the remote keypad initiates various events, depending upon a chosen option. The incorporation of a credit card swipe, or alpha-numeric entry through the remote keypad, allows interactions involving payments of money or purchases of goods and services. Additionally, the electronic device may include menus or other informational graphics designed to activate upon a user selecting a particular channel at a particular time.

The genlock implemented with the preferred embodiment provides each user with a simple telestration apparatus. An option from one menu provides the user with the ability to overlay images produced from the pointing device and a background of the user's choice. The choices include, among others, a blank background, a predefined background image, or an image captured from the television program, static or live. This feature has applications in many fields, including for example education and sports.

The preferred embodiment of the present invention includes a built-in messaging system for the user. The system permits exchange of messages to and from other electronic device users, computer users or various facilities. In this embodiment, the operating instructions of each electronic device directs the device to autonomously initiate a messaging call to a messaging facility at predetermined times when the user is not using the telephone line. The controller posts any untransmitted messages or user profiles at this time, and receives messages and any new configuration or operating instructions. If the controller receives new messages for the user, it lights a message indicator. This tells the user that new messages are waiting, prompting the user to initiate appropriate actions to access them.

When the user activates the electronic device, the controller displays the selection menu which includes those options available to the user. One available menu item permits the user to read the messages. The remote keypad controls the operation of the various features of the electronic device, such as message scrolling, rereading, saving or deleting particular messages, for example.

When the user desires to access the information and services, the user selects one of the menu items by operating the remote keypad. Selection signals from the remote keypad identify a particular menu item. The controller responds to the selection signals by identifying the desired service associated with the input from the remote keypad. The controller operates the communications device to access the telephone line. Accessing the telephone line permits connection to an independent computer system providing the desired service. The controller prompts the independent computer system to provide the desired information or service. The controller displays the desired information or service on the television, and waits for additional input from the remote keypad.

Use of a printer connected to the controller provides the user with an ability to produce a hardcopy of the information displayed on the television. Additionally, the printer can be used to print coupons, depending upon options selected by the user, or an interactor facility could determine appropriate coupons to be printed depending upon the user profile or other selection criteria. The printer could be used in a number of other different ways, including provision of coupons or other advertising or marketing incentives, tickets, chits, lottery tickets and the like, directly to the household.

Another aspect of the invention includes use of a stylus or pen-type pointing device as an input device, although other types are possible, such as a "joystick" for example, for creation of particular images on the television screen. A user controls a drawing cursor's position on the television display by moving the pointing device. After creating a desired image, the controller, responsive to selection signals from the remote keypad, prints images created with the pointing device, or captures the image and transmits it to an independent computer system. The independent computer system, depending upon particular menu options selected, directs the captured transmitted image to another user or to storage for later access. It is possible to capture television images transmitted from the television station and superimpose user-created graphics as mentioned above for the telestration capability.

Some pen-type pointing devices include a click button for indicating particular user actions when operated. One feature of an embodiment including this type of pointing device includes an ability to simulate keyboard input. The controller displays keyboard image on the television. The user subsequently identifies each desired key by clicking within the keyboard image at positions corresponding to desired key. Serially positioning the cursor and selecting particular key images permits simulation of typing. The controller is able to capture and transmit these typewritten-document images just as any other image.

Still another aspect of the present invention includes an integral credit card reader with the controller. This permits the user to conveniently purchase goods or services by use of the electronic device. A memory optionally stores the credit card information, facilitating purchases. In response to a purchase command, the system is able to simply request if the user desires use of the stored information rather than the user finding and "swiping" the credit card again.

The invention provides simple, efficient access to facilities without acquisition or configuration of computer components. Users select a desired service from among several services displayed in menu by operation of a remote keypad. Autonomous self-configuration of the electronic device allows a system operator to enhance services or operation quickly and ensure that all users have their chosen services available to them.

Reference to the remaining portions of the specification and the drawings realize a further understanding of the nature and advantages of the invention.

BRIEF DESCRIPTION OF THE DRAWINGS

FIG. 5 is an illustration a preferred embodiment of the remote keypad 22.

DESCRIPTION OF THE PREFERRED EMBODIMENT

Figure 1:
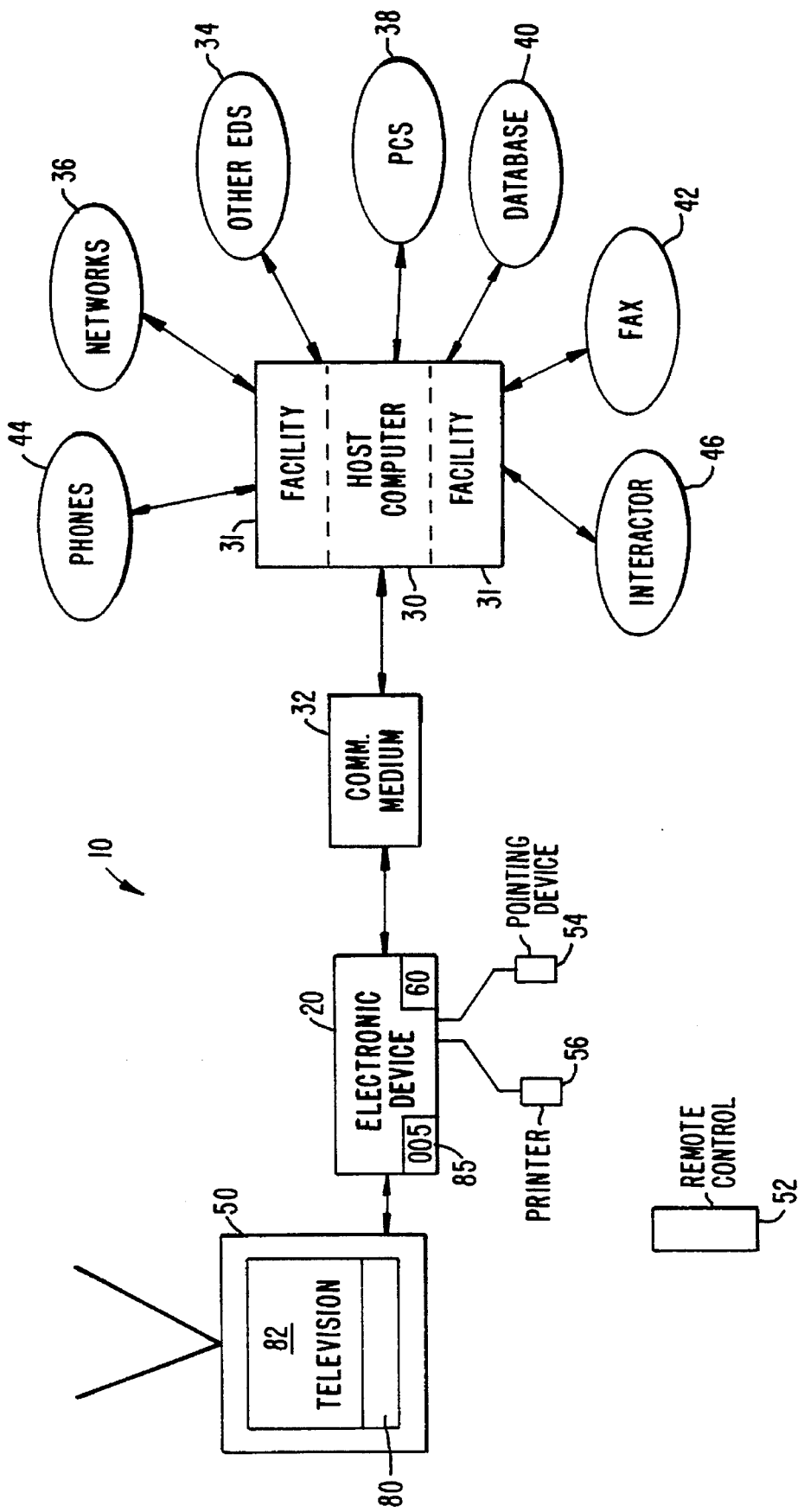
FIG. 1 is a block diagram of a videotext system 10 including an electronic device interface 20 having a preferred embodiment of the present invention.

FIG. 1 is a block diagram of a videotext system 10 including an electronic device interface 20 having a preferred embodiment of the present invention. The videotext system 10 includes an independent computer system (host computer) 30 providing one or more facilities a user desires to access. The host computer 30 connects to the electronic device 20 through a communications medium 32. Examples of the communications medium includes public-switched telephone networks and closed-circuit coaxial cables. The host computer 30 provides access to many facilities, including other electronic devices 34, networks 36, personal computers 38, databases 40, facsimile or telex services 42, and interactor facilities 46, for example. Interactor facilities are those facilities targeted for interaction with the user. They can be specially designed services or programming, or conventional programming which desire to interact with television/cable viewers.

The electronic device 20 interfaces these facilities for access and display on a conventional television display 50. The user selects and controls access to the facilities displayed on the television 50 by use of a remote keypad control 52. The remote keypad control 52 of the preferred embodiment is similar to conventional television remote controls for selection of channel and volume, for instance. The remote keypad control 52 provides menu selection signals to the electronic device for selection of a particular facility of the host computer 30. The general applicability and provision of this system, including use of menus, is described in the incorporated parent patent application. The present invention adds additional functionality to the electronic device previously disclosed.

The electronic device 20 of the preferred embodiment includes a stylus-type or pen-type pointing device 54 for creation of bitmap images on the television 50. The bitmap images include graphical and textual information drawn by the user. The user is able to direct the electronic device 20 to capture images from the television 50 screen. The images include any bitmap images created by the user. The electronic device 20 is able to transmit these captured images to the host computer 30 for storage or forwarding to any of the facilities the host computer 30 controls.

Applications of this embodiment of the present invention include use of the pointing device 54 to superimpose user created images over captured television station transmissions or educational and recreational sketching and drawing. Additionally, the pointing device 54 is able to function as a text input device by interaction with an image of a conventional typewriter keyboard. Through display of the keyboard image on the television, and monitoring cursor positions associated with "clicks" of the pointing device 54, a user may "typewrite" information on the screen.

The electronic device 20 includes an interface for a printer 56. The electronic device 20 directs selected, captured images to the printer 56 for hardcopy output. The printer 56 prints results of queries to the various selected facilities, the sketching with the pointing device 54, or any other screen displayed. A preferred embodiment responds to information from the facilities to print coupons, tickets, chits, other types of advertising and marketing incentives, lottery tickets, and the like, as appropriate. The system allows access to consumers making home shopping decisions and provides an opportunity to influence those decisions.

Shown in FIG. 1 is an integral credit card reader 60. This credit card reader 60 provides a ready and simple mechanism for each user to access premium facilities having a surcharge, or for purchase of items displayed by particular facilities.

The present invention incorporates a tuner, a "genlock" mechanism, and a time/date clock. These features allow the electronic device 20 to provide for windowed display 80 of the menus (overlaying the interaction menus on a portion of a conventional television broadcast, for example) and construction of a viewing profile, among other things.

In operation, the user activates the electronic device 20 and uses the remote keypad control 52 to tune the television 50 by use of the electronic device. A readout 85 on the electronic device 20 indicates the tuned station. The electronic device 20 records and stores the time and dates of operation and viewed frequency for periodic uploading to the host computer or to an appropriate facility. When the user selects a particular show matching a predefined criteria, a special menu or informational graphic is optionally displayed. Or, for certain programs, such as home shopping programming, the user may manually overlay a purchasing menu in the window 80. When a desired item is shown, the user is able to cause the electronic device 20 to issue appropriate purchase information to the interactor facility, automatically. Similarly, for other programming, such as advertisements, the user can request information regarding a product. For advertisements which are not specially designed, or which are not prearranged with the host computer, the request can be logged by station and time. Knowing the electronic device's ID, and other user information, the system 10 can record the request and still initiate a request for the specific information by accessing a history of the programming for the logged station, at the particular date and time. This system is applicable to polling events, where an user can automatically choose a menu item for a particular vote, or for making monetary contributions.

Figure 2:
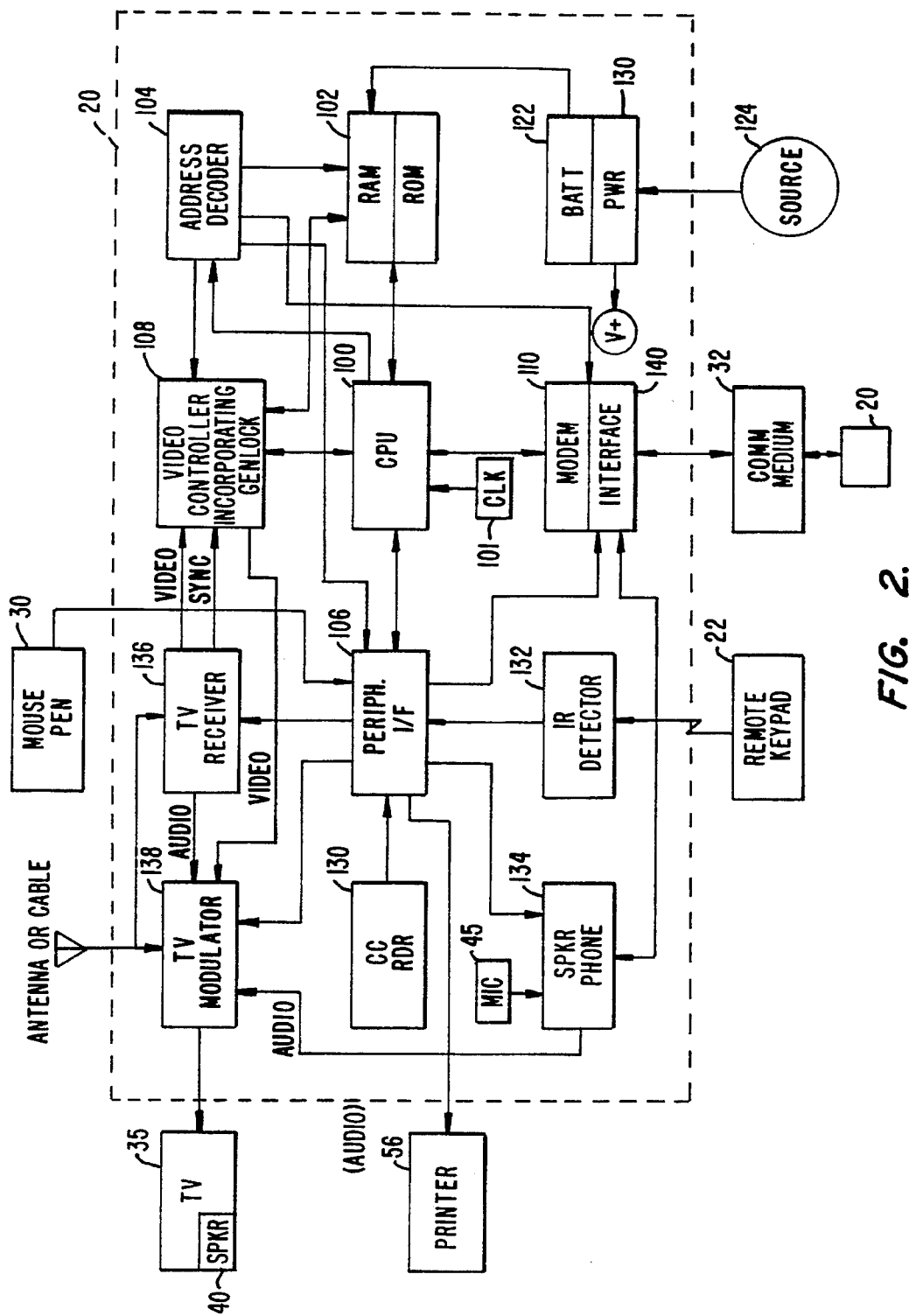
FIG. 2 is a block schematic diagram of the electronic device 20.

FIG. 2 is a block schematic diagram of the electronic device 20. The electronic device 20 is a microcontroller-controlled electronic appliance including a central-processing unit (CPU) 100 coupled to a clock 101, a memory 102, an address decoder 104, a peripheral interface 106, a video controller 108, and a modulator/demodulator (modem) 110 by a data and address bus. The memory 102 includes both random read/write memory (RAM) and read-only memory. A power supply 120 generates power for the components of the electronic device 20 ($V^+$), as well as to keep a battery-backup 122 charged. The battery-backup 122 provides power for the RAM when the power-supply 120 is not connected to a power source 124. Additionally, the electronic device 20 includes a credit card reader 130, an infrared detector 132, a speakerphone controller 134, a television receiver circuit 136, and a television modulator 138, all coupled to the peripheral interface 106.

The CPU 100 controls operation of the electronic device 20 according to instructions stored in the ROM and the RAM of the memory 102. The ROM includes an initialization sequence which the CPU 100 executes upon every reset or power-up. The initialization sequence includes a set of commands causing the electronic device 20 connect to a particular facility 30 and self-configure itself. The self-configuration includes receipt of particularized instructions for the particular electronic device 20, depending upon an identification code stored in the ROM. The CPU 100 stores these particularized instructions in the RAM.

The CPU 100 addresses the components of the electronic device 20 through the address decoder 104. The address decoder receives addresses from the CPU 100 and asserts a select signal to an identified component in response to a particular address. Components with an asserted select signal from the address decoder 104 interact with the CPU 100, either receiving instructions or providing data.

The peripheral interface 106 includes a parallel input/output port as well-known for interfacing to a printer 56, to the credit card reader 130, and to the IR detector 132. The peripheral interface 106 includes a serial interface for the pointing device 54. The parallel interface and the serial interface are separately selectable by the address decoder 104.

The television interface includes a video controller 108 for text and graphics, connected to a video memory and the video modulator 138 to produce television-compatible output. The television interface connects to a conventional television 38 for display of menus identifying the various facilities available to a user, and for displaying the information provided from a selected facility, as well as to enable screen-to-screen communication. The genlock mechanism is incorporated into the video controller 108. The modem 110 includes a modulator/demodulator used for data calls, to convert digital data to a format compatible with the communications medium, such as a conventional telephone system. Additionally, the modem 110 includes a communications interface 140 to actually send and receive signals relative to the communications medium. The speakerphone controller 134 interfaces directly to the modem interface 140 to implement the speakerphone operation.

The modem 110, through its modem interface 140 particularized for the communications medium used by the electronic device 20, communicates over the communications medium 50 to another electronic device 20. The modem 110 and the interface 140 permits the electronic devices 20 to exchange voice and data information. The CPU 100, under control of a program in the memory 102, controls the operational mode (voice or data).

The credit card reader 130, a conventional device, reads magnetically encoded information on credit and debit cards. The credit card reader 130 provides output information to the CPU 100 through the parallel input/output function of the peripheral interface 106.

The IR detector 132 receives menu selection signals from the keypad remote control 52. The IR detector 132 provides the CPU 100, through the peripheral interface 106, with particular key information selected.

Figure 3:
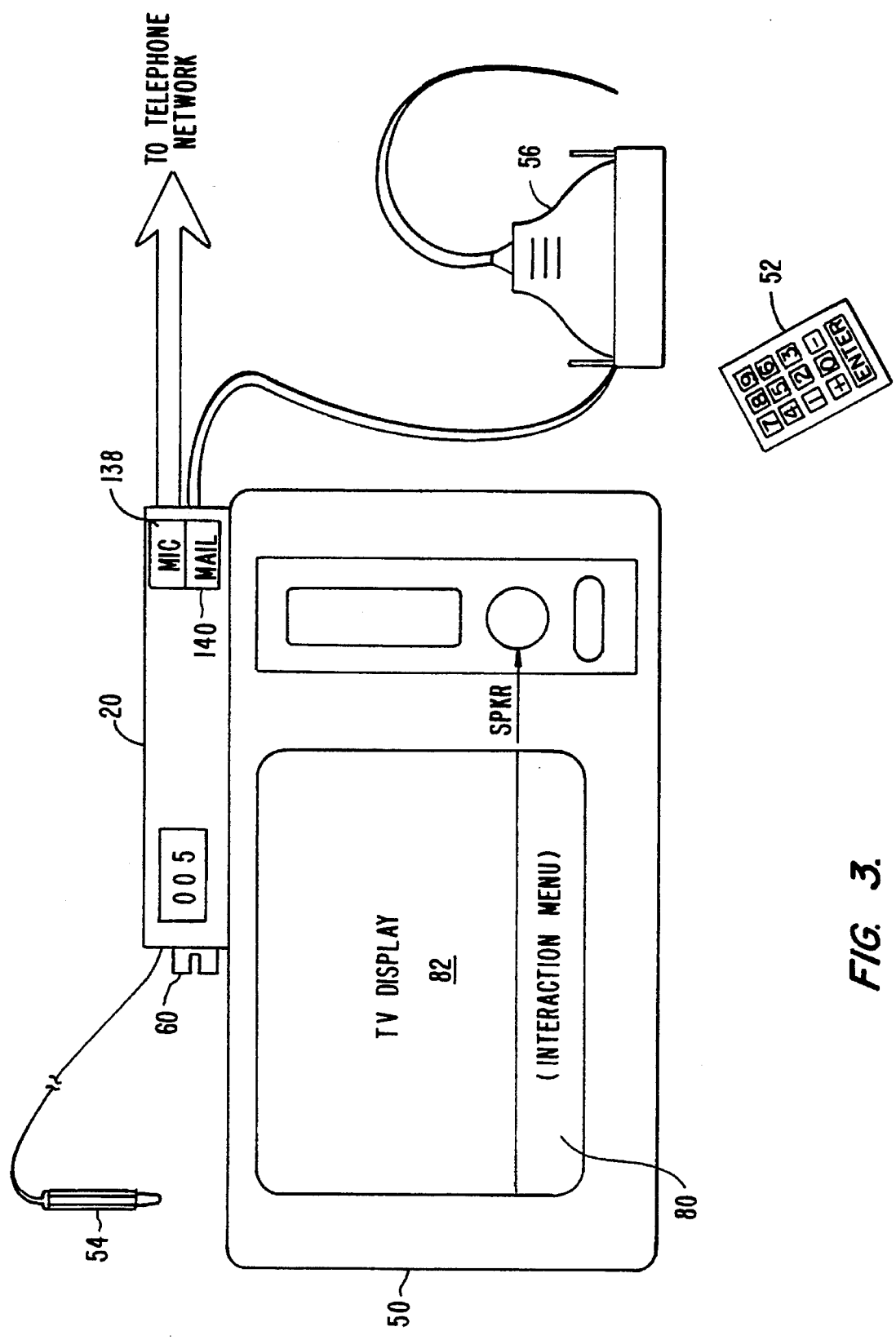
FIG. 3 is a schematic representation of one possible configuration of the system 10.

FIG. 3 is an illustration of one configuration of the electronic device 20 including display of selected menu items. The electronic device 20 provides the user with a menu of available services, displayed within the window 80. The size, orientation, and location of the window 80 can be changed, depending upon user preference or application. The menu in FIG. 3 includes several options which the user selects by use of the remote keypad control 52. The remote keypad control 52 does not employ a typewriter-type keyboard to implement the selected functions. By displaying a menu having numbered entries and selecting a corresponding number for a desired entry by use of the remote keypad control 52, the user accesses the desired facility. The electronic device 20 includes a mail indicator 140 which illuminates when new unread mail is available for the user.

Figure 4:
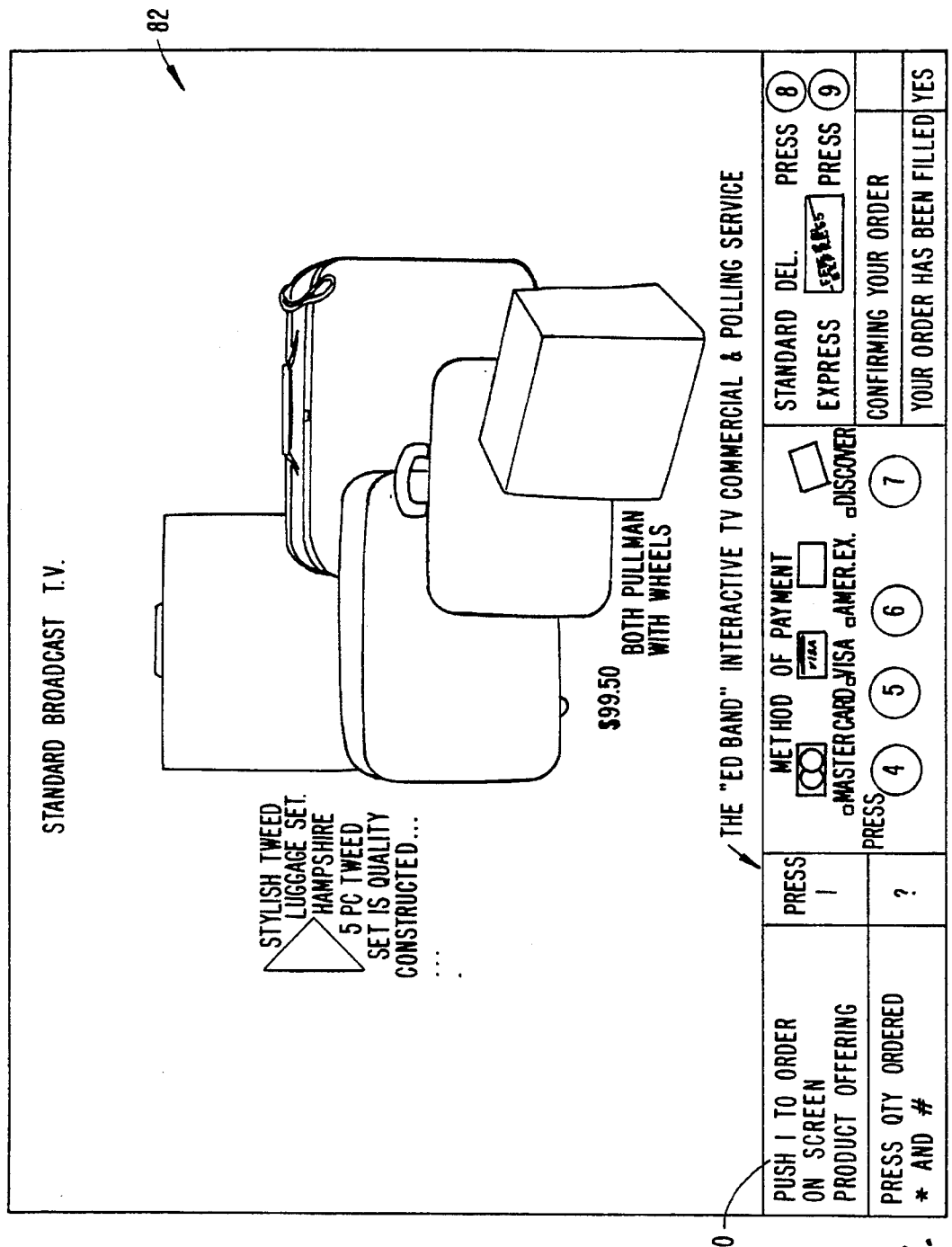
FIG. 4 is an illustration of one television display for electronic device 20 in operation.

FIG. 4 is an illustration of one television display for electronic device 20 in operation. The FIG. 4 illustration shows one implementation of an interface to a home shopping service. The regular broadcast appears in the television display 82, with an overlying menu window 80. This "ED-BAND" window permits a user, through activation of an appropriate control on the keypad remote 52, or by activation of the input device 30, to purchase the displayed product. The system is able to use prestored credit information to automatically initiate the purchase, or to use other purchase information, such as from another card passed through the credit card reader 60.

This is only a representative application of the present system. Other features are possible, such as telestration capabilities. In the telestration mode, a user could capture a screen image, and use the pointing device to edit or enhance an image captured from the television broadcast. Additionally, the telestration feature could be implemented in the window 80, while television broadcasting was received and displayed on the display 82. Two users could thus interact with each other and comment on particular programming, for example, by exchanging information in their telestration windows while they view a television broadcast.

FIG. 5 is a preferred embodiment of the remote keypad 22. FIG. 5 illustrates the use of an alpha-numeric array of keys to effectively and efficiently control the two-way communication of audio/visual information.

In conclusion, the present invention provides a simple, efficient solution to a problem of accessing and using the many electronic facilities presently available. Complex and time-consuming acquisition and configuration, as well as training in use of the computer components becomes unnecessary with the present device. The present invention allows direct access to the home to provide advertising and marketing incentives, such as coupons, for example. The nature and type of coupon could be selected directly by the consumer, or, the system could monitor purchasing decisions and provide coupons correlated or complementary to products actually purchased. While the above is a complete description of the preferred embodiments of the invention, various alternatives, modifications, and equivalents may be used. For example, the interaction, telestration, polling, contribution, and profiling features described above may be customized and adapted to a wide range of uses and applications. Therefore, the above description should not be taken as limiting the scope of the invention which is defined by the appended claims.

What is claimed is:

1. In a system having a host computer including an interactive facility for interacting with a television viewer, and an electronic device, coupled to said host computer via a communications network, for interacting with said host computer according to television programming, a method for monitoring television viewer activity and generating a coupon based thereon, said method comprising the steps of:

a. generating, according to said television viewer activity detected by said electronic device, viewer selection data;

b. generating, based on said viewer selection data, coupon printing data from the interactive facility for transmission to said television viewer;

c. transmitting said coupon printing data from the interactive facility to said electronic device for said television viewer;

d. generating, at said printer, said coupons according to said coupon printing data.

2. The method of claim 1, wherein said viewer selection data includes a purchasing profile of products purchased by said television viewer using said system.

3. The method of claim 1, wherein said viewer selection data includes a request by said television viewer for information relating to programming displayed on said television.

4. The method of claim 1, wherein said viewer selection data includes a viewer profile of programs selected by said television viewer over a predetermined time period.

5. A system for displaying selection options on a television correspondinq to television programming and for generating print media in response to a viewer selecting among said selection options, said system comprising:

a communications network;

a host computer, coupled to said communications network, including a facility for generating printer data responsive to purchasing information received over said communications network;

an electronic device including:
  a television interface for interfacing to a television;
  a communications interface for interfacing to said communication network coupled in turn to said host computer;
  a printer;
  an input device for producing a plurality of control signals; and
  a controller, coupled to said television interface and to said communication interface, for printing printer data received over said communication network from said host computer, said controller including:
    means, responsive to a first of said plurality of control signals, for generating said purchasing information for initiating a purchase of a product displayed on said television;
    means, coupled to said printer and responsive to a second of said plurality of control signals, for generating print media according to said printer data received from said host computer.

6. The system of claim 5 wherein said printer data includes a ticket.

7. The system of claim 5 wherein said facility further includes means for determining the appropriate printer data to generate responsive to said purchasing information.

8. The system of claim 5 wherein said printer data includes a marketing incentive.

9. The system of claim 8 wherein said marketing incentive includes a coupon.

10. A system for monitoring television viewer activity and generating print media based thereon, said system comprising:

a host computer including:
  a first communications interface for interfacing to a communications network;
  an interactive facility, coupled to said first communications interface, for interacting with said television viewer responsive to viewer interaction data that is received over said communications network;
  means for storing said viewer interaction data; and
  means, coupled to said first communications interface, for generating and transmitting printer data responsive to said stored viewer interaction data; and an electronic device including:
  a second communications interface for interfacing to a communications network and, in turn, to said host computer;
  a television-interface for interfacing to a television;
  a printer;
  an input device for providing control signals;
  a controller comprising:
    means, responsive to said control signals from said input device, for generating said viewer interaction data corresponding to said television programming; and
    means, coupled to said printer and responsive to said input device, for generating print media according to said printer data received from said host computer.

11. The system of claim 10, wherein said viewer interaction data includes purchasing information for initiating a purchase of a product displayed on said television.

12. The system of claim 10, wherein said viewer interaction data includes a request by said television viewer for information relating to programming displayed on said television.

13. A system for monitoring television viewer activity and generating print media based thereon, said system comprising:

a host computer including:
  a first communications interface for interfacing to a communications network; and
  a facility, coupled to said first communications interface, for generating and transmitting printer data responsive to viewer selection data; and an electronic device including:
  a second communications interface for interfacing to a communications network and, in turn, to said host computer;
  a television interface for interfacing to a television;
  a printer;
  an input device for providing control signals;
  a controller comprising:
    means, coupled to said second communications interface, for generating said viewer selection data;
    means, coupled to said printer and responsive to said control signals from said input device, for generating print media according to said printer data received from said host computer.

14. The system of claim 13, wherein said viewer selection data includes purchasing information for initiating a purchase of a product displayed on said television.

15. The system of claim 13, wherein said viewer selection data includes a viewer profile of programs selected by said television viewer over a predetermined time period.

16. The system of claim 13, wherein said viewer selection data includes a viewer purchasing profile of product purchased by said television viewer using said system.

17. The system of claim 13, wherein said viewer selection data includes a request by said television viewer for information relating to programming displayed on said television.

18. A system for automatically monitoring television viewer activity and generating coupons based thereon, said system comprising:

a host computer including:
  a first communications interface for interfacing to a communications network; and
  a facility, coupled to said first communications interface, for generating and transmitting coupon printing data responsive to a viewer profile; and an electronic device including:
  a second communications interface for interfacing to a communications network and, in turn, to said host computer;
  a television interface for interfacing to a television;
  a printer;
  an input device for printing control signals;
  a controller comprising:
    means, coupled to said second communications interface, for generating said viewer profile;
    means, coupled to said printer and responsive to said control signals from said input device, for generating coupons according to said coupon printing data received from said host computer.

19. The system of claim 18 wherein said means for generating a viewer profile comprises a means for monitoring the programs selected by the viewer.

* * * * *